Nov. 23, 1937.　　　O. W. RANDOLPH　　　2,100,150
DEHYDRATOR
Filed Jan. 20, 1936　　　5 Sheets-Sheet 1
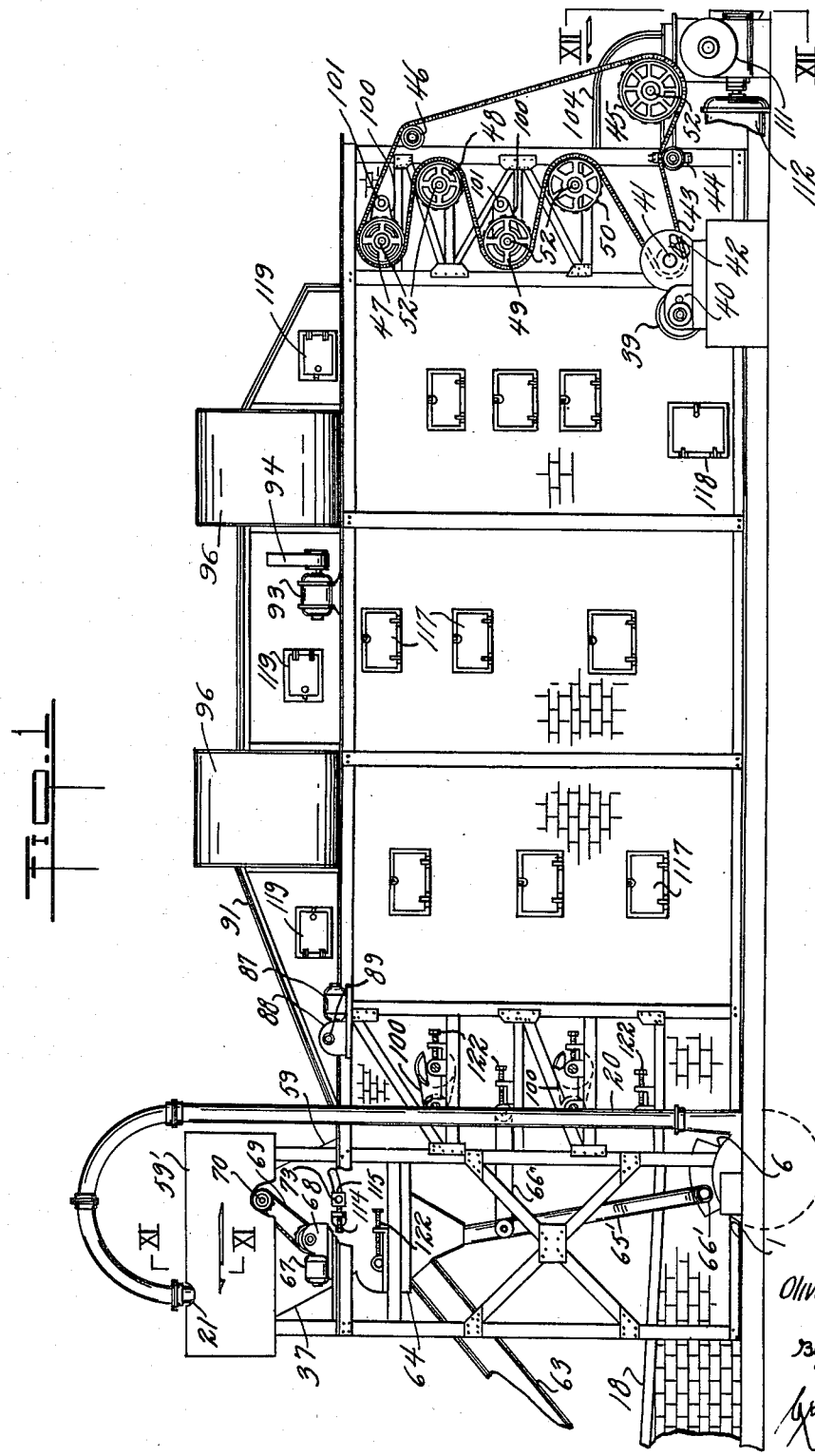
Inventor
Oliver W. Randolph
By
Attorney

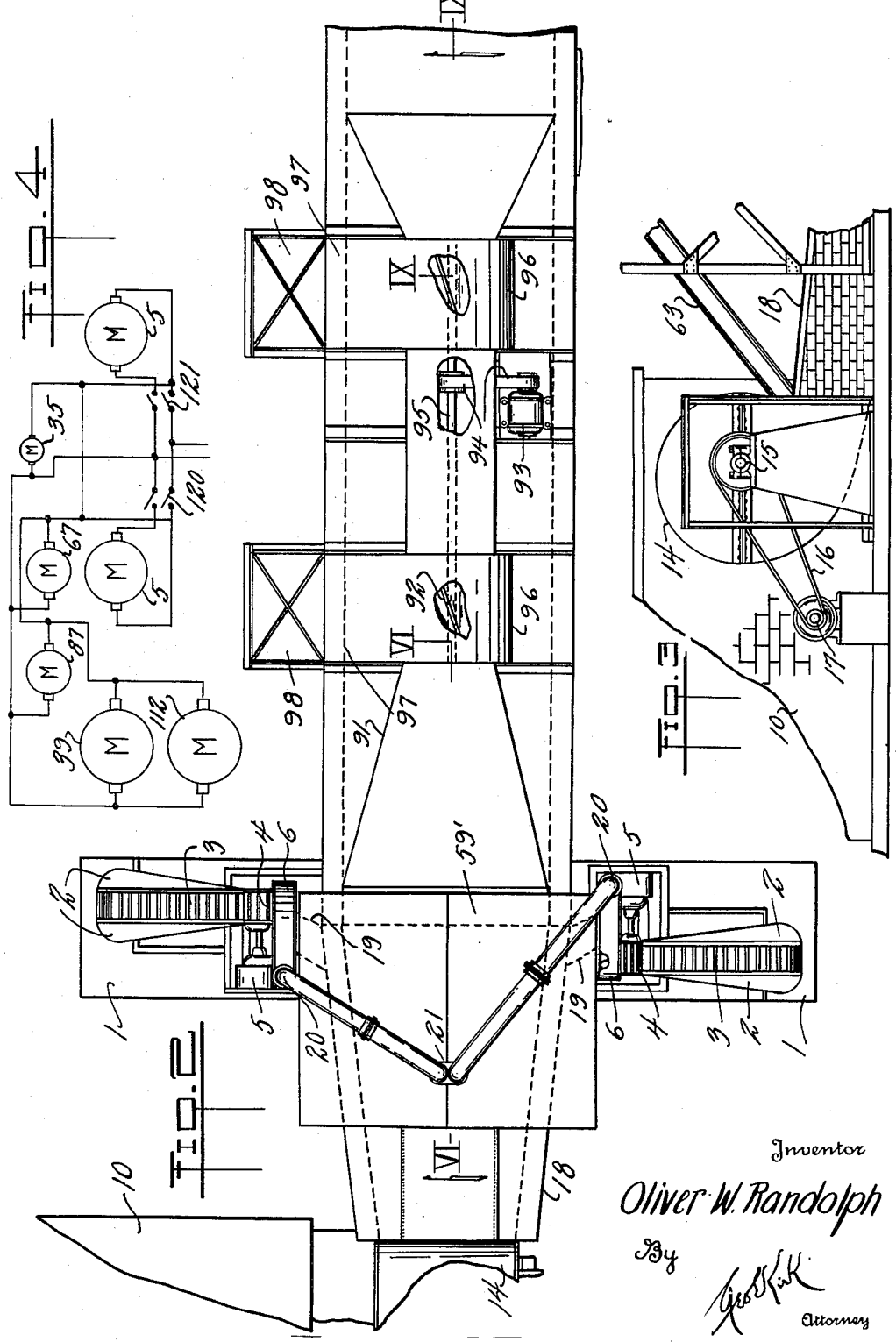

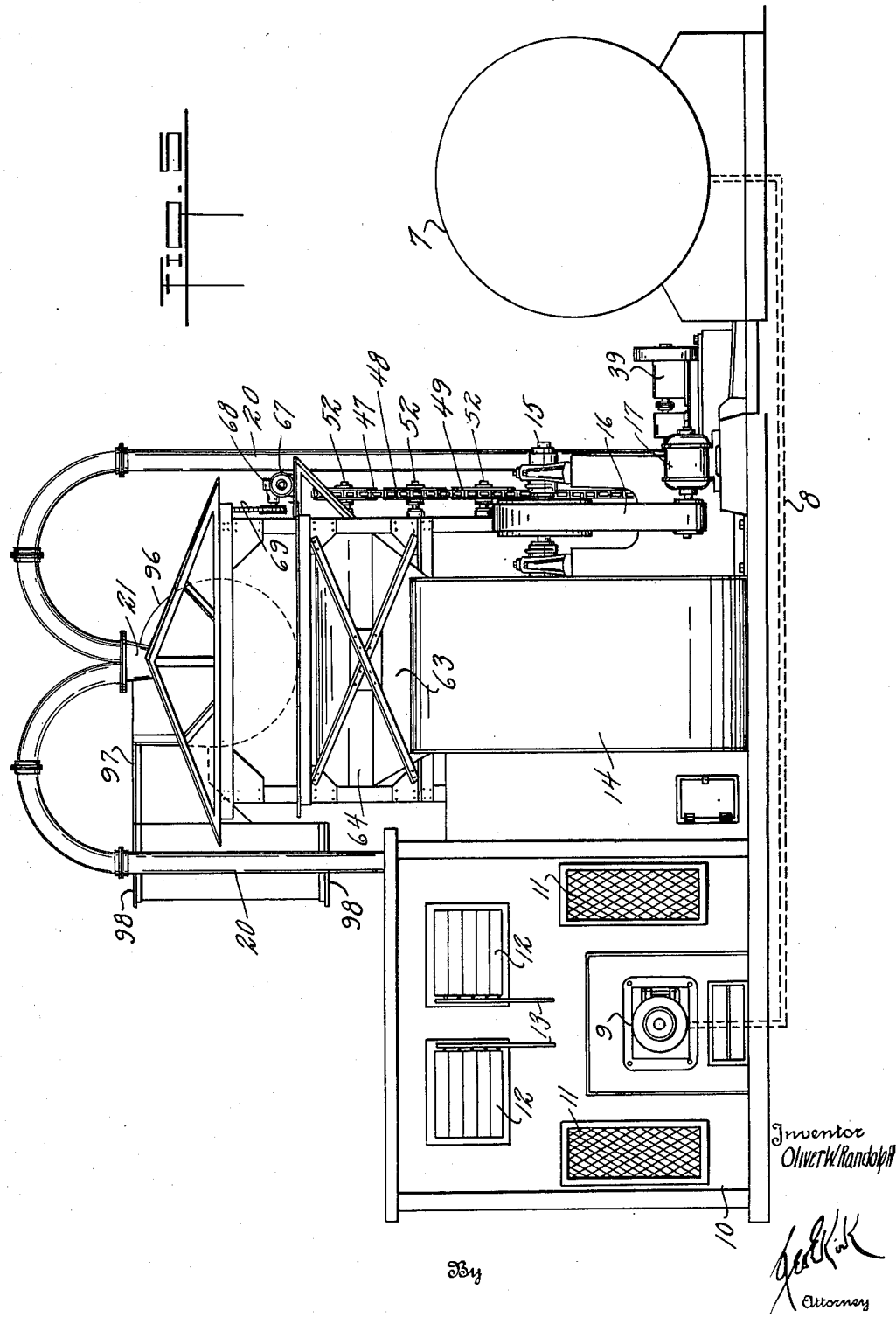

Nov. 23, 1937.   O. W. RANDOLPH   2,100,150
DEHYDRATOR
Filed Jan. 20, 1936   5 Sheets-Sheet 4
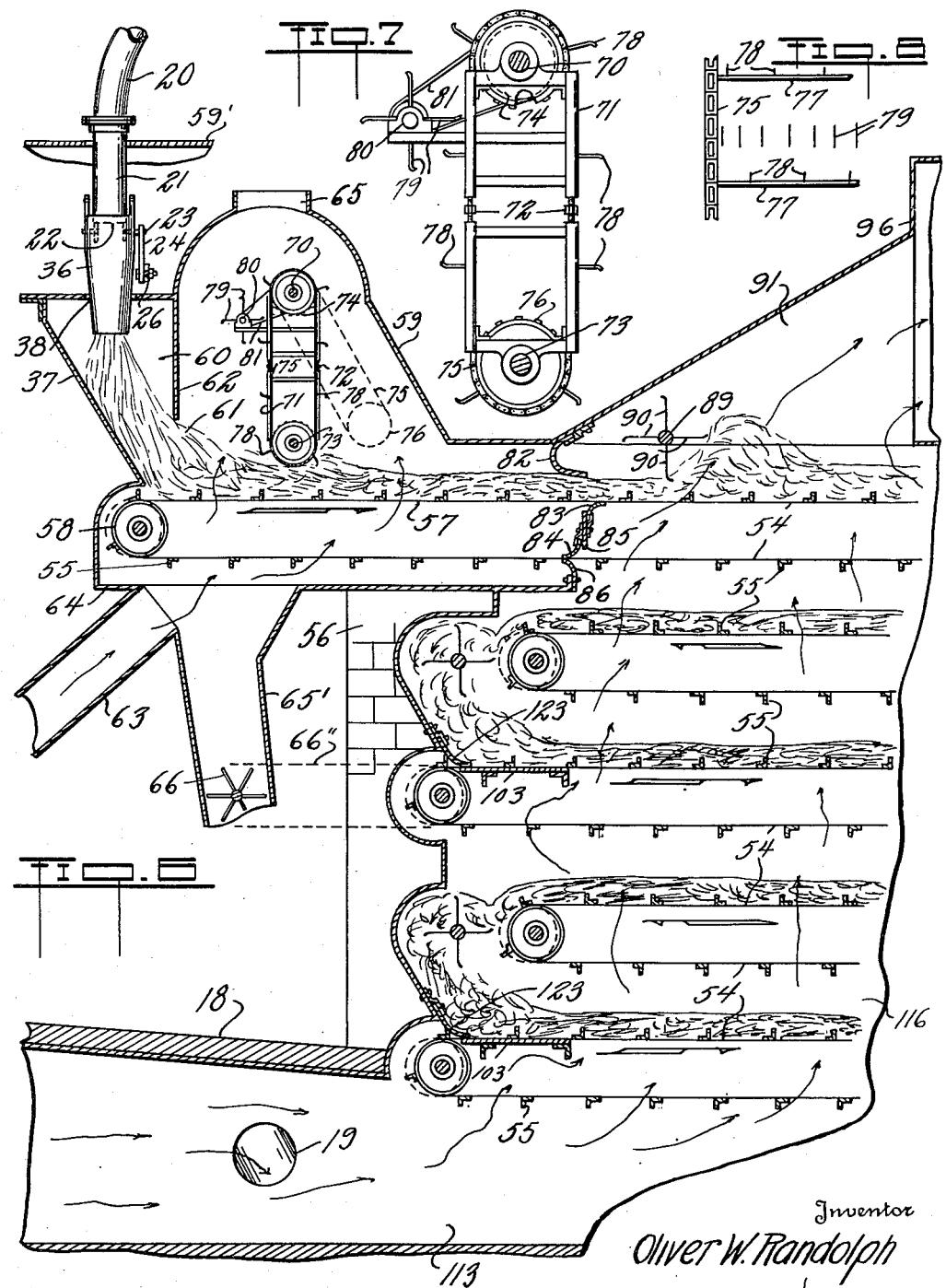
Inventor
Oliver W. Randolph
By
Attorney

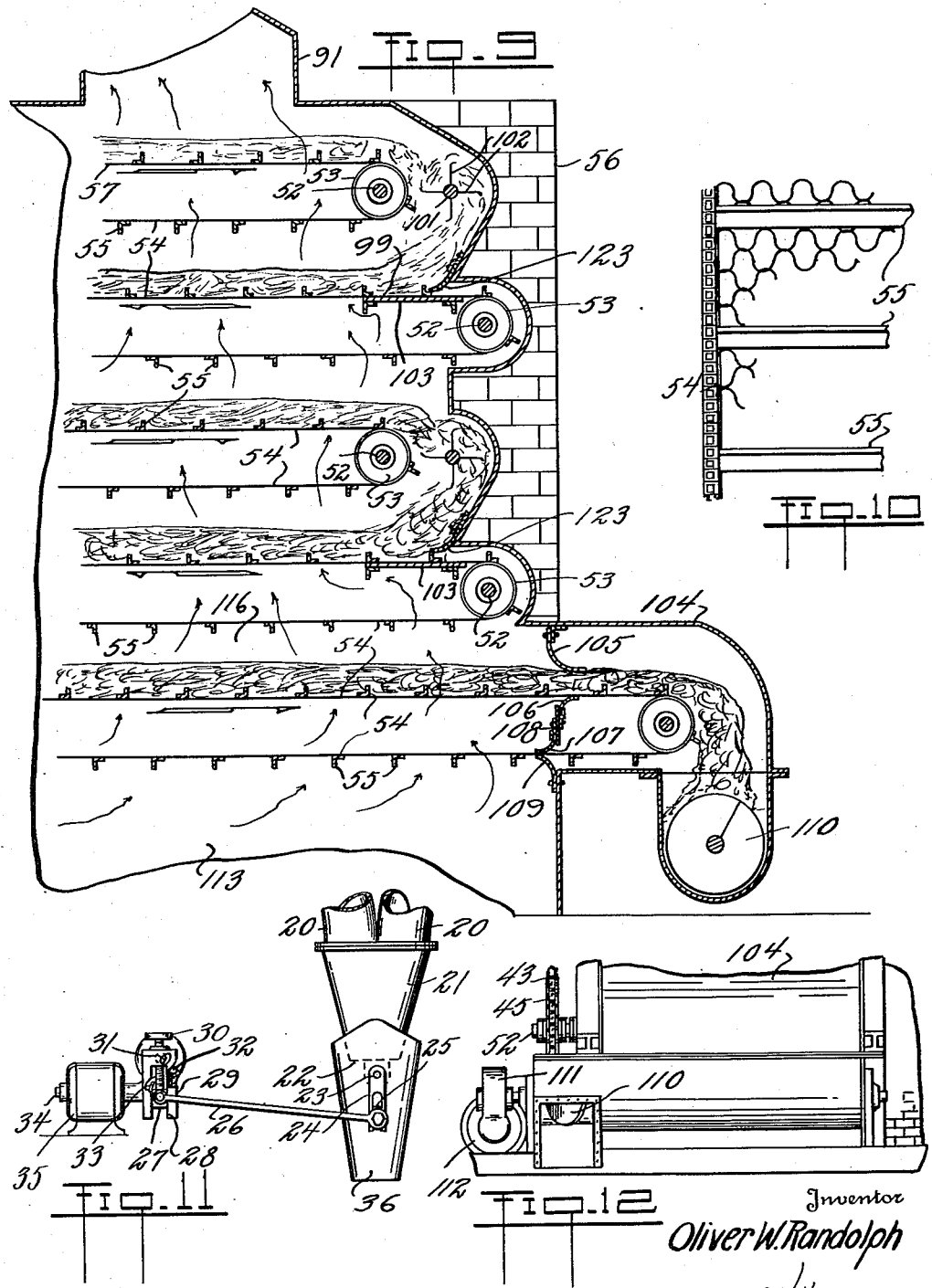

Patented Nov. 23, 1937

2,100,150

UNITED STATES PATENT OFFICE 2,100,150

DEHYDRATOR

Oliver W. Randolph, Toledo, Ohio

Application January 20, 1936, Serial No. 59,925

3 Claims. (Cl. 34—12)

This invention relates to the removal of moisture from material, especially moisture incidental to growth and crop conditions as forage crops.

This invention has utility when incorporated in apparatus for conveying and agitating the material, while supplementing said conveying and agitating with air currents in effecting dehydration treatment.

Referring to the drawings:

Fig. 1 is a side elevation, with parts broken away, of an embodiment of the invention, more particularly as adapted to the handling of foliage crops, such as alfalfa;

Fig. 2 is a plan view of a portion of the apparatus of Fig. 1, parts being broken away;

Fig. 3 is a fragmentary side elevation of portions of the apparatus of Fig. 1, to the left of the showing in Fig. 1;

Fig. 4 is a wiring diagram of electric control connections;

Fig. 5 is an end view from the left of Fig. 1;

Fig. 6 is a partial section on the line VI—VI, Fig. 2;

Fig. 7 is an enlarged detail view of features of the loosening-up device;

Fig. 8 is a fragmentary view showing the relation of the picker clean-off as to the loosening device rake;

Fig. 9 is a section on the line IX—IX, Fig. 2;

Fig. 10 is a fragmentary plan view of a portion of belt in the treating section;

Fig. 11 is a partial section on the line XI—XI, Fig. 1, showing features of the spreader; and Fig. 12 is a fragmentary view on the line XII—XII, Fig. 1, showing the take-off for treated material.

Receiving deck 1 (Fig. 2) may have dumped thereinto material supply of freshly cut grass, hay, or even root or head crops. Such material passes by way of chute or directing walls 2 to conveyor 3 and chopper 4, driven by motor 5. This material as passing the chopper 4 enters blower 6. Reserve fuel supply as oil tank 7 (Fig. 5) has pipe line 8 therefrom to burner 9 in furnace 10 having air supply 11 as a constant supply about and from the combustion chamber in this furnace 10. Additionally, this furnace 10 is equipped with louvers 12 having adjustment means 13 for supply of further fresh air.

This controlled volume of warm air from the furnace 10 is acted upon by blower 14 (Fig. 3) mounted on shaft 15, driven by belt 16 from motor 17. This blower 14 has main discharge through tunnel 18, from which there is branch outlet 19 (Figs. 2, 6) providing warmed air supply for the elevator blower 6, from which extends ascending duct 20 (Figs. 1, 2, 6). This duct 20 terminates in down spout 21 having spill terminus 22 (Fig. 11) with depending fixed extension therefrom in which is mounted fulcrum pin 23 carrying swingable slotted arm 24 in which is adjustable block 25, from which extends connecting rod or link 26 to block 27 in slot 28 of arm 29. The block 27 is radially adjustable by screw 30. This arm 29 is fixed with shaft 31 having thereon worm wheel 32 actuated by worm 33 on shaft 34 of motor 35. Fixed with this rocking arm 24 is spreader chute 36 swinging transversely in hopper 37 (Fig. 6). About this chute 36, there is opening 38 which allows exhausting laterally in the swing region of the hot air of this elevator conveyor, which air is moisture laden and has effected initial moisture extraction from this material being handled.

Motor 39 (Fig. 1) through speed reduction 40 drives shaft 41 and pulley 42 fixed thereon, and about which passes belt sprocket chain 43 past belt tightener 44 over pulleys 45, 46, to drive conveyor pulley 47, say eight feet per minute. The pulleys of the succesion of these conveyor drives are proportioned for desired rate of speed reduction, as seven and one-half feet per minute for pulley 48, seven feet per minute for pulley 49, six and one-half feet per minute for pulley 50, and six feet per minute for pulley 45. These pulleys are on shafts 52 carrying drums 53 (Fig. 9), about which pass wire mesh links 54 (Fig. 10) of conveyor belt having flights 55 fixed thereon.

The upper reach of the conveyor belt 54 is for travel to the pulley 47 in treating section housing 56. This uppermost reach 57 is passed about pulley 58 (Fig. 6) and accordingly has provided a movable bottom for the hopper 37, effective to convey the delivered material from this hopper 37 as a spreader section into loosening device at chamber 59 under roof 59' normally trapped from chamber 60 in the hopper 37 by material 61 approximately closing off this chamber 60 from the section 59 due to depending wall 62.

From the blower 14 there is a branch hot air duct 63 (Figs. 3, 6) which, in the instance of forage, provides a wilting temperature as such warmed air enters housing 64 and the air may pass up into the material as spread upon the conveyor belt reach 57. This air as forced into this section may be taken out by way of port 65. Duct 65' takes any fines from the chopped material which may sift through the conveyor belt and be brought theretoward by the flight 55 in the lower reach of this upper conveyor. These fines may pass air-flow checking valve 66 delivering to discharge connection 66' connected to the elevator blower 6. This valve 66 is driven by belt 66'' from a conveyor pulley and keeps the duct 65 empty while preventing air flow out to the blower 6.

At this wilting chamber 59 there is motor 67 having speed reduction drive 68 connected through belt 69 with drive shaft 70 (Figs. 6, 7). This shaft 70 carries therefrom frame 71 having belt tightener adjustment 72 for follower shaft 73. Upon the shaft 70 is mounted sprocket wheel 74 having sprocket chain 75 thereabout extending to sprocket wheel 76 on the shaft 73. This sprocket belt structure carries cross pipes or bars 77 (Fig. 8) upon which are mounted claws 78 in successively staggered relation effective as pickers in acting upon the material as coming thereto by the reach 57 from the hopper 37. These claws 78 are effective looseners at the relatively high speed of rotation herein compared with the travel rate of the reach 57, and loosen, fluff, ted, or separate this transversely spread material as entering the chamber 59. This material is kept from compacted travel by clean-out or picker claws 79 (Fig. 7) on shaft 80, driven by belt 81 at a higher speed than the shaft 70.

This fluffed-up, spread material may pass from this chamber 59 to the treating chamber or treating section housing 56. In entering this housing the material has its wilting or dehydrating air cut-off from direct flow therewith due to flexible wiper 82 (Fig. 6) above the reach 57, wipers 83, 84, mounted by frame 85 between the reaches of this upper conveyor, and wiper 86 as to the lower side of this upper conveyor. These flexible wipers 82, 86, have sufficient clearance flexibility to allow the flights 55 to pass, while this upper wiper 82 is sufficiently flexible to retain the spread material against being blown through this air trap or valve.

Motor 87 (Fig. 1) has speed reduction drive 88 operating shaft 89 at relatively high speed compared with the travel of the conveyor reach 57 to operate picker claws 90 (Fig. 6) as a re-loosening up device against packing resulting from the flexible wiper 82. This loosening up of the wilted material by the relatively high speed picker arms 90 is not such as to fluff this green or moist material to the end that it is drawn off in passage 91.

This passage 91 is a delivery way into suction fans 92 (Fig. 2). A motor 93 is connected by belt 94 to drive shaft 95 for the pair of fans 92 in fan housings 96. There is thus provided effective take-off or sub-atmospheric pressure condition for the delivery or air discharge sides of this treating chamber housing. This air exhausted from these rotary fans 92 is delivered to ways 97 into vertically open exhausts 98. These exhausts, accordingly, are not responsive to the direction of air current or winds so that they are continuously effective to spill the drawn-off air from the treating chamber or housing.

The reach 57 in the housing 56 is short of the extent of longitudinally staggered succeeding conveyor operated from the pulley 48. There is, accordingly, provided a receiving portion 99 (Fig. 9) for this succeeding of the superposed belts or conveyors as to the supply belt or conveyor thereover. From the conveyor thereover, belt 100 operates shaft 101 having claws or picker arms 102, effective as loosening means for the partially dehydrated flow of material, fluffing, tedding, or separating such in its descent toward this receiving portion 99. This receiving portion 99 is protected against up draft therethrough by diaphragm or valve portion 103 extending a distance to direct rising warm air only through the re-laid fluffed material. The difference in speed of these succeeding ones of the superposed conveyors is such that this loosening up stage or fluffing may re-distribute the fractionally dehydrated material in approximating such distribution that the material is uniform over the region of the conveyor belts and is effective in providing a uniform draft resistance so that there is approximated uniformity in the passage of the warming air through the several upper reaches of the various conveyors in the back and forth travel of the treated material through this chamber.

The lowermost of these conveyors extends about drum driven by the pulley 45 and in housing extension 104 (Fig. 9). Flexible valve means 105, 106, 107, on intermediate frame 108 and lower valve 109 trap the chamber of this housing 104 from the treating chamber so that this dehydrated material may fall upon screw conveyor 110 driven by speed reduction 111 (Figs. 1, 12) from motor 112. Additionally to these flexible wipers, the scroll conveyor 110 is effective against blowing off of warmed air from the tunnel 18 (Fig. 6) in passing of said air to chamber 113 below the lowermost belt. Due to the blower capacity, this volume of warmed air supply passes upward through material on the succeeding upper reaches of the conveyor belts. As so pressure-supplied, this warmed air supply has further factor for effective even distribution thereof due to sub-atmospheric pressure from the upper take-off fans 92. There is accordingly an effective capacity which may be flexible in response to widely varying atmospheric conditions as well as widely varying rate of material handling.

The motor drive 39 is adjustable as to the speed of these conveyor belts in varying the capacity. Likewise there may be desired conditions to vary the thickness of the spread material from the chamber 59, and this is effected by rocking the frame 71 due to the action of hand screw 114 (Fig. 1) acting on block 115 fixed with the shaft 73. Inspection of the chamber 116 above the chamber 113 is conveniently had through doors 117 (Fig. 1), while access to the chamber 113 may be had through door 118. Access to the upper reach of the belt through and into the housing may be had by doors 119 (Fig. 1).

By throwing in switch 120, the supply device on one side of the housing from feeding deck 1 may be effected, while upon operating switch 121 the feeding deck on the opposite side may be effective. In throwing in either motor 5 there is simultaneously cut-in motor 35 for the spreader, motor 67 for the loosening up, and motor 87 for the supplemental loosening as well as the drive for the blower 6, conveyor motor 39 and discharge scroll motor 112. Tighteners 122 are provided for the conveyors. Rubber belt sections 123 co-operate with the valve portion 103 similarly in action to the wiper 82.

What is claimed and it is desired to secure by Letters Patent is:

1. A drier housing, charging and discharging openings in the housing, means for charging material through the charging opening, said means including an oscillating chute, spreading means including a continuous rake, superimposed conveyors for conveying the material from the charging opening to the discharging opening, agitators between the conveyors, drive means causing the rake and agitators each to be movable relatively to the housing and conveyors, sealing means providing a partition dividing the housing into a charging and spreading compartment, a drying compartment, and separate air supply means for each compartment independent of air re-circulation therebetween, said chute and rake being operable in said air-supplied spreading compartment.

2. A drier housing including partition means therein providing a plurality of compartments, said housing having a supply opening for receiving the material to be treated, and a discharge opening for delivering treated material therefrom, means for charging material into the housing through the charging opening, said means and supply opening providing in the housing a charging and spreading compartment, conveyors through said compartment and therefrom through the housing, said housing providing an additional drier compartment spaced from said charging and spreading compartment by said partition means, through which drier compartment said conveyors extend from the charging and spreading compartment, and means for supplying upwardly flowing drying air independently to said compartments.

3. A drier housing, there being charging and discharging openings in the housing, means for charging material through the charging opening, superimposed conveyors for conveying the material from the charging opening to the discharging opening, sealing means providing a partition dividing the housing into a charging compartment and a drying compartment intermediate the ends of the upper conveyor, separate air supply means having an intake duct connected to the lower part of each compartment for flowing drying air upward through each compartment separate from the other and through the different conveyors independently of air re-circulation therebetween, an adjustable spreading rake in the charging compartment between the air supply to the compartment and exhaust from the compartment, and actuating means for driving the rake in effecting movement thereof relatively to the housing and conveyors.

OLIVER W. RANDOLPH.